W. L. WOLFORD
SHOCK ABSORBER FOR AUTOMOBILES.
APPLICATION FILED JUNE 30, 1916.

1,202,465.

Patented Oct. 24, 1916.

Inventor
Walter L. Wolford,

By Ithiel J. Cilley
Attorney

UNITED STATES PATENT OFFICE.

WALTER L. WOLFORD, OF FREMONT, MICHIGAN.

SHOCK-ABSORBER FOR AUTOMOBILES.

1,202,465.

Specification of Letters Patent.  Patented Oct. 24, 1916.

Application filed June 30, 1916. Serial No. 106,962.

*To all whom it may concern:*

Be it known that I, WALTER L. WOLFORD, a citizen of the United States, residing at Fremont, in the county of Newaygo and State of Michigan, have invented certain new and useful Improvements in Shock-Absorbers for Automobiles, of which the following is a specification.

My invention relates to improvements in shock absorbers, so called, for use on automobiles to prevent sudden and unpleasant shocks, or jarring of the car when running over rough roads, and its object is to provide a means for neutralizing the shock both upon the downward, and the upward movement of the automobile. I attain this object by the mechanism and arrangement of parts shown in the accompanying drawing, in which—

Figure 1:
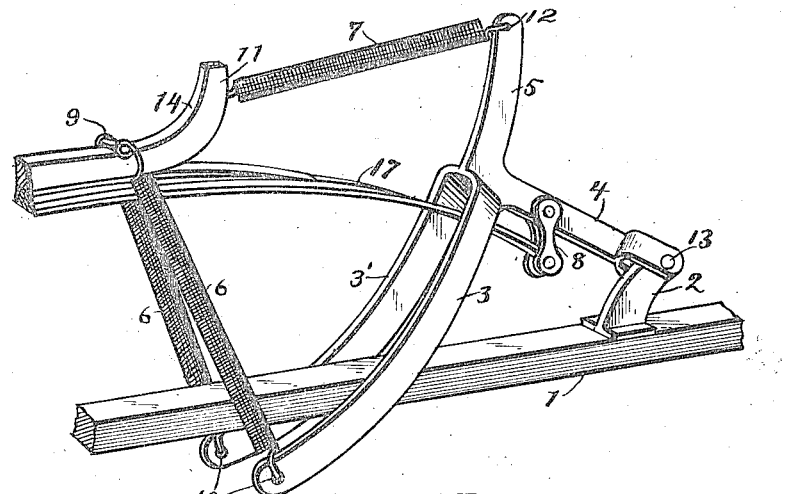
Figure 2:
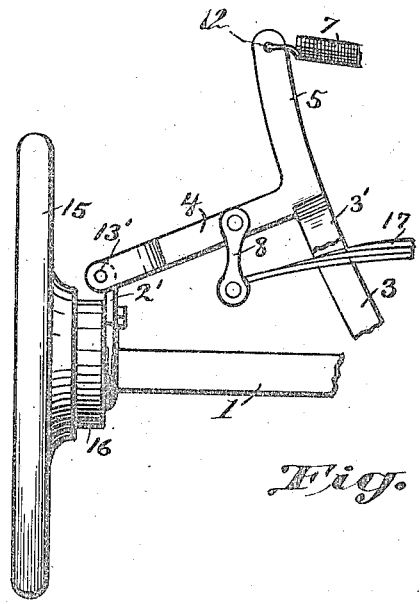

Figure 1 is a perspective of my appliance, and of the parts of an automobile to which it is applied, and Fig. 2 is an elevation of the same as applied to the hind axletree of the automobile, but with the downwardly extending arms or forks cut off near the spring.

Similar reference numerals refer to similar parts wherever placed on the drawing.

In the accompanying drawing 1 represents the axletree, 14 the supporting beam that carries the body of the automobile, not here shown, and 15 represents the hind wheel of the vehicle. For the purpose of properly mounting my shock absorber upon the axletree of an automobile it is necessary to change the position of the spring supporting perch 2 so the end of the arm 4 may be pivotally supported by the perch, as at 13, and the end of the vehicle spring 17 may be mounted in the lower end of the yoke or stirrup 8, the upper end of which is pivotally secured to the arm 4, of the lever 3, 4, 5, substantially as shown in Fig. 1 and Fig. 2, to form a short leverage between the stirrup and the fulcrum, or pivotal bearing 13.

I provide for neutralizing the shock of a downward movement of the body of the automobile by extending arms 3, 3', (made integral with the arm 4,) downward and toward the longitudinal center of the axletree, astride thereof, and connect the ends of these arms with the bracket or beam 14, with two strong helical springs, as 6, 6, as indicated at 9. The length of the arms 3, 3' from the stirrup 8, being much greater than the distance between said stirrup and the pivotal support 13 of the arm 4, the movement of the ends of the arms is so much in excess of the movement of the ends of the spring 17, at 8, that as soon as a rut has been entered by a wheel of the automobile and a sudden downward movement is imparted to the vehicle, the rapid movement of the ends of the arms 3, 3' forces the excess of strain upon the springs 6, 6, and greatly lessens the movement of the ends of the spring 17, thus absorbing very much of the shock that would otherwise be brought, very suddenly, upon the spring 17, and carrying the vehicle over a rut or rough spot in a highway with little or no shock or sudden jar. By this means practically all of a downward shock is absorbed in the springs 6, 6.

I provide for absorbing any upward shock that might follow a downward shock by extending an integral arm, 5, upward from the base of the arms 3, 3', and connecting its upper end with the end of the bracket 14 by means of a strong helical spring 7, corresponding with the springs 6, 6, as indicated at 11, 12 in Fig. 1. It will be readily understood that as soon as the return movement of the center of the spring 17, and the bracket 14 has commenced, after a sudden downward movement, as hereinbefore mentioned, the greater distance traveled by the upper end of the arm 5, than that traveled by the stirrup 8, will immediately begin to draw heavily on the spring 7 and absorb a very large per cent. of the shock that would, otherwise, result from the upward movement of the automobile body if no restraint was placed upon it.

To make this appliance fully available upon the hind axletree I find it necessary, or at least, very desirable to carry the perch 2' as close to the wheel hub 16, as possible, hence I have shown the perch 2' reversed to carry the pivotal bearing 13' outward over the periphery of the said hub 16.

It is to be understood that I do not restrict myself to the exact manner of attaching and connecting the several elements that go to make up my invention, but desire to cover as my invention the broadest possible means of utilizing the absorbing powers of the several elements provided by me and added to the usual automobile construction, and especially as relating to the hanging and controlling of ordinary elliptical, or semi-elliptical springs, for overcoming, and to a great extent, absorbing the extreme shock incident to driving light automobiles over hard, hubby and rough roads.

While the side springs, 7, 7, are of almost inestimable value in their efficiency in absorbing the shock of a sudden upward movement of an automobile body, they are equally efficient in absorbing, or obviating side sway of the body of the automobile, and, also, in connection with the springs 6, 6, they almost wholly eliminate the quick jarring, jerky, throbbing movement of the body, caused by the reciprocating movement of the engine piston when in operation for propelling the automobile.

What I claim as new, and desire to secure by Letters Patent of the United States, is:

1. In combination with the axletree, supporting perches, semi-elliptical spring and the body supporting bracket of an automobile, a three way lever having one arm pivotally connected with a supporting perch, a single arm extending upward, and a bifurcated arm extending downward practically at right angles from the integral end of the pivoted arm, a stirrup pivotally mounted on the pivoted arm near the perch, said stirrup fitted to receive and support the end of the semi-elliptical spring, strong helical springs connecting the bifurcated arm with the body bracket, and a single strong helical spring connecting the end of the upwardly extending arm with the end of the body bracket.

2. In combination with the axletree, perches mounted on the axletree, the body bracket and springs of an automobile, T shaped levers having the stems of the T pivotally mounted on the perches, and helical springs connected at one end with the body bracket, and at the other end with each of the projecting ends of the cross arms of the levers, a stirrup pivotally connected with the pivoted arm of each lever and fitted to receive and support the ends of the automobile springs.

3. In combination with the axletree, body bracket, perches and semi-elliptical springs of an automobile, three armed levers having one arm pivotally connected with the perches, a stirrup pivotally connected with said arm a short distance from the perches, said stirrups fitted to receive and pivotally support the ends of the automobile springs, an arm integral with, and extending upward from the pivoted arm, a helical spring connecting this arm with the end of the body bracket, a bifurcated arm integral with and extending downward from and at an obtuse angle with the pivoted arm, to positions adjacent to the axletree, and a helical spring connecting each end of each wing of said bifurcated arm with the body bracket of the automobile.

W. L. WOLFORD.

Attested:
CARLOS R. BAUGHMAN,
CLARENT SEGUIN.